United States Patent
Seeland et al.

(10) Patent No.: US 11,820,364 B2
(45) Date of Patent: Nov. 21, 2023

(54) AUTOMATIC SELECTION OF ONE OF MULTIPLE PARKING ASSISTANCE FUNCTIONS IN A MOTOR VEHICLE

(71) Applicant: Volkswagen Aktiengesellschaft, Wolfsburg (DE)

(72) Inventors: Jana Seeland, Wolfsburg (DE); Bastian Göricke, Wolfsburg (DE); Markus Radimirsch, Uetze (DE); Christian Hopp, Wolfenbüttel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 176 days.

(21) Appl. No.: 17/474,640

(22) Filed: Sep. 14, 2021

(65) Prior Publication Data
US 2022/0080956 A1 Mar. 17, 2022

(30) Foreign Application Priority Data
Sep. 15, 2020 (DE) ...................... 10 2020 211 549.4

(51) Int. Cl.
*B60W 30/06* (2006.01)
*B60W 10/04* (2006.01)
(Continued)

(52) U.S. Cl.
CPC ............ *B60W 30/06* (2013.01); *B60W 10/04* (2013.01); *B60W 10/18* (2013.01); *B60W 10/20* (2013.01);
(Continued)

(58) Field of Classification Search
CPC ...... B60W 30/06; B60W 10/04; B60W 10/18; B60W 10/20; B60W 2422/50;
(Continued)

(56) References Cited

U.S. PATENT DOCUMENTS 9,540,045 B2 1/2017 Becker et al.
2007/0282502 A1* 12/2007 Bayer .................. B62D 15/028
701/42
(Continued)

FOREIGN PATENT DOCUMENTS

DE 102004039179 A1 2/2006 ............... G08G 1/16
DE 102006052575 A1 5/2008 ............ B60W 30/06
(Continued)

OTHER PUBLICATIONS

DE 102010001368 A1 U.S. Pat. No. 9,540,045 B2.
(Continued)

*Primary Examiner* — Jonathan M Dager
*Assistant Examiner* — Jean W Charleston
(74) *Attorney, Agent, or Firm* — Slayden Grubert Beard PLLC

(57) ABSTRACT

The invention relates to a motor vehicle and to a method for operating a motor vehicle for carrying out a parking procedure, wherein the motor vehicle comprises at least a first parking assistance function and a second parking assistance function, which may be selected as desired, and wherein the method comprises: detecting a gripping status of a steering handle of the motor vehicle by a driver; and automatically selecting the first or the second parking assistance function depending on the gripping status.

14 Claims, 2 Drawing Sheets

(51) Int. Cl.
  *B60W 10/18* (2012.01)
  *B60W 10/20* (2006.01)
(52) U.S. Cl.
  CPC ... *B60W 2422/50* (2013.01); *B60W 2540/223* (2020.02); *B60W 2710/06* (2013.01); *B60W 2710/18* (2013.01); *B60W 2710/202* (2013.01)
(58) Field of Classification Search
  CPC ....... B60W 2540/223; B60W 2710/06; B60W 2710/18; B60W 2710/202; B62D 1/286; B62D 15/0285
  USPC .......................................................... 701/41
  See application file for complete search history.

(56) References Cited

U.S. PATENT DOCUMENTS

| | | | | |
|---|---|---|---|---|
| 2013/0060421 | A1* | 3/2013 | Kadowaki | B62D 15/027 701/36 |
| 2013/0162829 | A1* | 6/2013 | Kadowaki | H04N 7/18 348/148 |
| 2014/0350804 | A1 | 11/2014 | Park et al. | 701/51 |
| 2016/0107690 | A1* | 4/2016 | Oyama | B62D 5/046 701/41 |
| 2017/0200373 | A1 | 7/2017 | Funke et al. | |
| 2018/0093662 | A1* | 4/2018 | Kim | B60W 30/06 |
| 2018/0186407 | A1* | 7/2018 | Kim | B60W 10/18 |
| 2018/0273092 | A1* | 9/2018 | Engels | B62D 15/0285 |
| 2019/0329761 | A1* | 10/2019 | Kim | B60W 10/18 |
| 2020/0023833 | A1* | 1/2020 | Martin | B62D 15/027 |
| 2021/0031773 | A1 | 2/2021 | Augst | |

FOREIGN PATENT DOCUMENTS

| | | | | |
|---|---|---|---|---|
| DE | 102009010006 A1 | | 10/2009 | ............ B60W 30/06 |
| DE | 102010001368 A1 | | 8/2011 | ............ B60W 10/18 |
| DE | 102010030208 A1 | | 12/2011 | ............ B60W 30/06 |
| DE | 102012221036 A1 | | 5/2014 | ............ B60W 30/06 |
| DE | 102018202780 A1 | | 8/2019 | ............ B60W 50/08 |
| DE | 102018105649 A1 | * | 9/2019 | |
| DE | 102018105649 A1 | | 9/2019 | ............ B60W 10/04 |
| DE | 102018132456 A1 | | 6/2020 | ............ B60W 10/04 |
| EP | 3421328 A1 | | 1/2019 | ............ B62D 15/02 |
| JP | 2004203315 A | * | 7/2004 | ............ B62D 1/286 |
| JP | 2004203315 A | | 7/2004 | ............... B62D 1/28 |

OTHER PUBLICATIONS

DE 102018202780 A1 US 2021/0031773 A1.
German Office Action, Application No. 1020202115494, 6 pages, dated May 11, 2021.
Ford, "Enhanced Active Park Assist," https://www.ford.com/technology/driver-assist-technology/enhanced-active-park-assist/, 5 pages, © 2021.
Extended European Search Report, Application No. 21194556.3, 7 pages, dated Jan. 26, 2022.

\* cited by examiner

AUTOMATIC SELECTION OF ONE OF MULTIPLE PARKING ASSISTANCE FUNCTIONS IN A MOTOR VEHICLE

CROSS-REFERENCE TO RELATED APPLICATIONS

This application claims priority to German Patent Application No. DE 10 2020 211 549.4, filed on Sep. 15, 2020 with the German Patent and Trademark Office. The contents of the aforesaid patent application are incorporated herein for all purposes.

TECHNICAL FIELD

The invention relates to a method for operating a motor vehicle and to a motor vehicle, wherein a selection may automatically be made between multiple parking assistance functions. The motor vehicle is for example a passenger car or a truck.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

It is known to provide a vehicle driver with parking assistance functions to assist with parking procedures. The parking procedures may include procedures for pulling in and/or pulling out. They may also include maneuvering procedures, e.g. in narrow places, on the way to a parking lot (i.e., on approaching the parking lot) and/or with a trailer. The parking assistance function may generally be intended for unburdening the driver from the task, which is often considered difficult, to maneuver the vehicle into or back out of the confined space of a parking space by selecting suitable steering angles and/or turning points.

Currently known parking assistance functions are characterized by a varying extent of the range of functions and for example of the actions that may be performed autonomously of the driver (i.e., automatically).

Driver-autonomous longitudinal guidance is one example, in which vehicle acceleration may also be selected autonomously of the driver, with the vehicle driver selecting the gear or direction of travel if necessary.

Depending on the personal preference of the vehicle driver, for example with regard to a current parking situation, a varying degree of assistance with the parking procedure may be desired. A first finding is that parking assistance functions of different types between which a driver may choose could be provided to a driver. These parking assistance functions may be designed according to any of the examples outlined above, i.e., be characterized by a varying degree of autonomously executable actions, for example with regard to transverse guidance and/or longitudinal guidance.

Furthermore, any parking assistance function mentioned herein may be used in any of the following contexts or for at least one of the following purposes: Assistance with parking procedures with the driver in the vehicle, for example assistance (or help) with or takeover of longitudinal and/or transverse guidance, for example only assistance with or takeover of transverse guidance may take place; driver-autonomous parking without the driver being in the vehicle (so-called remote park assist); assistance with (and/or driver-autonomous performance of) maneuvering procedures, for example in narrow places, in turning procedures, on trained routes, with a trailer or when coupling a trailer.

In order to select from a corresponding plurality of available parking assistance functions, an operator has previously had to perform an unintuitive input via special operating elements, for example by actuating a pushbutton on the steering wheel and/or a virtually superimposed operating element or a virtual selection option, e.g. on a central vehicle touchscreen. From the point of view of the driver, this is inconvenient, potentially susceptible to errors and also poses a safety risk, since the driver must then, for example, search for the input option for selecting a parking assistance function selected by said driver at the time in moving road traffic after having found a suitable parking space. As a result, the driver could be distracted from the traffic.

SUMMARY

A need exists to improve the selection of a suitable parking assistance function, for example with regard to the operating convenience and/or operational reliability of the motor vehicle.

The need is addressed by the subject matter of the appended independent claims. Embodiments of the invention are described in the dependent claims, the following description, and the drawings.

DESCRIPTION

Figure 1:
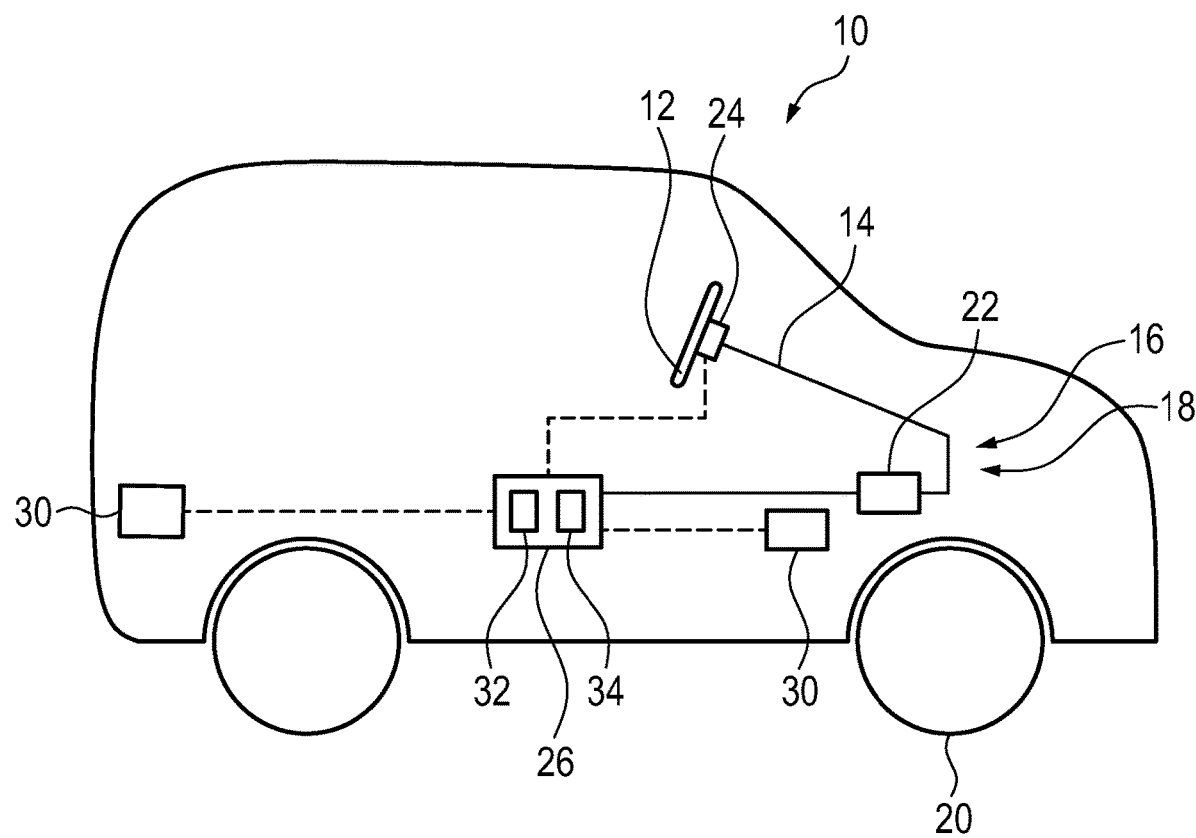
FIG. 1 shows a motor vehicle according to one exemplary embodiment.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In general terms, some embodiments herein provide for automatically choosing between at least two available parking assistance functions. This may be an initial selection such that a desired parking procedure may be carried out. However, it may also be a selection during an ongoing parking procedure, for example if a switch is to be made from an initially activated parking assistance function to another.

The selection is made in consideration of an operating state of the motor vehicle by the vehicle driver (in the following also referred in places merely as the driver). For example, this operating state may be a gripping status of a steering handle of the motor vehicle, i.e., for example whether or not the driver is currently gripping the steering handle. This may take place by means of a so-called hands-off (or hands-free) recognition system of the like currently already installed in vehicles. Said system may for example be based on capacitive sensor principles.

Depending on whether or not the driver is gripping the steering handle, one of the parking assistance functions may thus be selected automatically and/or it is possible to automatically switch between available parking assistance functions. For example, no additional measures are required on the part of the driver in order to make such a selection and/or such a switch. For example, it is possible for the driver to not have to actuate special (real or virtual) operating elements of the type explained above.

In other words, the driver may thus automatically activate a specific parking assistance function by gripping or releasing the steering handle or to prompt a corresponding automatic selection between the parking assistance functions (knowingly or unknowingly from the point of view of the driver). This ensures a convenient, intuitive and reliable selection of a suitable parking assistance function, whereby the driver may also concentrate on the surrounding traffic.

In some embodiments, at least a first and second parking assistance function are available which are distinguished by a varying degree of autonomy (or autonomy level of autonomy). For example, a first parking assistance function may, in the manner described below, generate only temporarily effective torques or merely indicate generally suitable steering maneuvers without carrying out same in a fully autonomous manner. A second parking assistance function with a correspondingly higher level of autonomy may for example, in contrast, carry out transverse guidance and/or longitudinal guidance autonomously of the driver of the type described above. If the driver is not gripping the steering handle, the parking assistance function with the higher level of autonomy may be selected in some embodiments. However, if the driver is gripping the steering handle, the parking assistance function with the lower level of autonomy may be selected in some embodiments.

As such and in some embodiments, by determining the gripping status of the steering handle, it is possible to reliably determine and/or the driver may intuitively specify the extent to which said driver would like to retain control over the vehicle (gripping) or that said driver wishes to be assisted in an autonomous manner by the assistance function (non-gripping).

In some embodiments, a method for operating a motor vehicle for carrying out a parking procedure is provided, wherein the motor vehicle comprises at least a first parking assistance function and a second parking assistance function (or may be operated in accordance with a first and a second parking assistance function). The parking assistance functions are for example different from one another, may be selected and/or activated as desired and the method may, e.g., comprise:

detecting a gripping status of a steering handle of the motor vehicle by a driver;
automatically selecting the first or the second parking assistance function depending on the gripping status.

The parking assistance functions may be provided by means of at least one control circuit and/or may be software functions that may be executed by at least one control circuit of the motor vehicle in some embodiments. In a manner known per se, said parking assistance functions may actuate other components of the motor vehicle and/or receive information therefrom, for example sensor signals.

The steering handle may be a steering wheel in some embodiments. The gripping status may be either the steering handle not being gripped or being gripped. It is also possible to detect intermediate stages, for example gripping with only one hand or mere touching in points with individual fingers in some embodiments. These intermediate stages may optionally be classified as the steering wheel being gripped or not being gripped in some embodiments. Alternatively and in some embodiments, such intermediate stages may also be assigned assistance function. For example, at least one third assistance function may be assigned to a detectable intermediate stage. In general, for safety reasons, for example only gripping of the steering handle with both hands may be classified and detected as actual gripping.

The gripping status may be detected by means of known sensor apparatuses mentioned above that are, for example, based on capacitive sensor principles. Alternatively, optical detection, for example by an interior camera, is also conceivable.

The selection of the first or second parking assistance function may take place automatically and thus autonomously of the driver. For example, it may take place when the start of a parking procedure has been recognized and/or when a changing gripping status is detected during an ongoing parking procedure. Examples of both variants are explained below.

In some embodiments, the method may also comprise the initial step of recognizing a parking procedure (for example one that has started or one that is to be carried out). For example, the driver may have activated a parking space search by means of the environment sensors of a motor vehicle and/or a parking space may have been automatically found by the motor vehicle. For example, if the driver then (in the proximity of the recognized parking space) stops the vehicle, it may be concluded that a parking procedure is to be initiated or carried out. Subsequently, the gripping status of the steering handle may be detected and the parking assistance function may be automatically selected.

However, it is also possible to initially select a parking assistance function without taking into account the gripping status, as will be explained below. Then, but also in the case of a selection based on the gripping status, it is possible to automatically switch to another parking assistance function during the ongoing parking procedure on the basis of the detected gripping status and for example on a change hereto. This also increases operating convenience and operational reliability, since the driver may then automatically prompt the selection of a suitable parking assistance function (i.e., one that is appropriate to the situation) by simply gripping or releasing the steering handle.

According to some embodiments, the first and the second parking assistance function are each configured to generate forces and/or torques in a steering system of the motor vehicle autonomously of the driver. By means of these forces and/or torques, driver-autonomous vehicle transverse guidance is possible and/or a selected steering direction and/or a turn-in point may be indicated to a driver. In the latter case, transverse guidance cannot be carried out completely autonomously of the driver, but rather said driver may be prompted to set a suitable steering angle simply by means of the temporary generation of a torque.

In both cases, the parking assistance functions may in some embodiments draw on at least one actuator (for example an electric motor) in a steering system of the motor vehicle and/or actuate same in order to generate corresponding forces or torques. In the case of an electromechanical steering system with an intact mechanical coupling between the steering handle and a steering gear, the actuator may in some embodiments act on the steering gear (for example it may be an actuator that acts on a rack). In the case of a steer-by-wire steering system without a corresponding mechanical coupling, the actuator may in some embodiments be a reaction force actuator that is coupled to the steering handle.

According to some embodiments, the first parking assistance function is configured to generate at least temporarily effective torques on a steering handle as a steering hint for the driver. This torque may for example be generated in the form of a jolt in order to prompt the driver to steer in to a greater extent. However, it may also be an additional steering torque by means of which the steering resistance may be reduced in at least one direction. This may also be perceptible by the driver as a steering hint.

The steering torques of the first parking assistance function are in some embodiments lower than that of the second. They cannot be sufficient for the vehicle to be transversely guided in a completely autonomous manner.

A parking assistance function of this kind may support the parking procedure but not carry out same automatically without manual intervention in some embodiments. As an alternative to an at least temporary generation of torque and in some embodiments, visual and/or audible steering hints, for example, may be output by means of the first parking assistance function.

In contrast, the second parking assistance function may be configured, according to some embodiments, to generate the steering torque required for parking autonomously of the driver and for example completely autonomously of the driver. In other words, it may thus carry out and/or cause driver-autonomous transverse guidance of the vehicle. Additionally or alternatively and in some embodiments, driver-autonomous longitudinal guidance according to conventional variants may be provided.

As already mentioned, it is then, e.g., possible, if the gripping status changes, to switch to the respective other of the first and second parking function. Consequently, after automatic selection of the first and second parking assistance function, the gripping status may for example be monitored continuously and it is then possible to switch between the first and second parking function, if applicable multiple times in the case of repeated changes.

In this context and in some embodiments, it is possible to switch from the first to the second parking assistance function if the gripping status indicates that the steering handle is not being gripped (e.g., is released) by the driver. This variant is particularly beneficial if the first parking assistance function merely provides steering hints in the manner described above. The driver is then supposed to implement the steering hint themselves, i.e., manually. However, if the driver does not grip the steering handle or lets go thereof, it is beneficial in some embodiments to automatically switch to another (for example the second) parking assistance function, by means of which a higher level of autonomy may be achieved and/or by means of which fewer interventions on the part of the driver are required. One difference between the parking assistance functions therefore for example consists in whether the driver actuates the steering (and, if applicable, the accelerator and brake) themselves (first parking assistance function) or whether the vehicle does this autonomously under the supervision of the driver (second parking assistance function).

Additionally or alternatively and in some embodiments, it is possible to switch from the second to the first parking assistance function if the gripping status indicates that the steering handle is being gripped by the driver. This may indicate that the driver would like to take control of the transverse guidance themselves, such that the driver-autonomous generation of steering torques should advantageously be limited.

However, as already mentioned, an initial parking assistance function may in some embodiments also be selected and activated by means of the detected gripping status. For example, if the driver initially grips the steering handle, the first parking assistance function may be activated. In contrast, if the driver initially does not grip the steering handle, the second parking assistance function may be activated. However, as already mentioned, this may be changed as soon as the gripping status of the steering handle changes during the ongoing parking procedure.

Accordingly, in some embodiments, the method comprises an initial selection of one of the first and second parking assistance function. This for example takes place on the basis of at least one default configuration setting. In this case, the method in some embodiments also comprises: selecting and thus switching to the respective other of the first and second parking assistance function on the basis of the detected gripping status. This may at least take place if the gripping status indicates another selected parking assistance function or is associated with such a parking assistance function. The initial function may be preserved provided that it corresponds (e.g., is assigned) to the gripping status.

The default configuration setting may be a default setting that may be configured by the vehicle manufacturer and/or a vehicle owner in some embodiments. It may specify, for example based on status conditions explained below and/or fixed or flexible criteria, the situations in which the first or second parking function is to be selected initially. This allows the driver to be provided with a parking assistance function that is appropriate to the situation from the outset or allows said function to be set initially in an for example automatic manner. If this selection turns out to be inappropriate from the point of view of the driver, the driver may switch to a parking assistance function selected by them by changing the gripping status. Then, a parking assistance function that is more appropriate to the situation may be activated autonomously of the driver in consideration of the changed gripping status.

For example, the default configuration setting may define at least one status condition which must be met in order for the first or second parking assistance function to be selected initially. The status bond may for example describe the status of the driver, vehicle and/or vehicle surroundings, for example the parking situation.

For example, if the vehicle is close to a defined location at which, for example, parking procedures take place more frequently and/or fully automatic parking procedures were previously trained in within the framework of a parking assistance function, a parking assistance function with a correspondingly high level of autonomy may then be activated. In this case, the status condition relates to the location of the vehicle or the proximity to a location with a parking procedure that has been trained in accordingly. Furthermore, the presence of a trailer may be detected as a status condition and then, for example, a suitably adapted parking assistance with an for example high level of autonomy may be activated. Equally, if a safety belt lock of the driver is or was released, a trailer coupling assistant may be activated as a parking assistance function, as described in DE 10 2017 220

459 A1 of the applicant, incorporated by reference herein, for example. Furthermore, when the safety belt lock is released, a remote park assist of the above-mentioned type may be activated, whereby the driver monitors the parking procedure of the vehicle while being close to (but not inside) the vehicle.

In some embodiments, the driver may be prompted to confirm the parking assistance function accordingly selected for activation prior to actual activation of the parking assistance function (i.e., actual implementation hereof, e.g., by the control circuit). For example, an accordingly selected parking assistance function may be visually communicated to a driver or communicated via an audio output and said driver may then be asked to confirm and/or approve the actual activation or implementation of said parking assistance function. This variant is beneficial for example during initial selection of a parking assistance function, as already discussed above, in order to prevent mis-selections. Alternatively and in some embodiments, any parking assistance function automatically selected in this context may be immediately activated or implemented automatically (i.e., may for example start to generate forces/torques autonomously of the driver). This applies, for example, to parking assistance functions that are selected during an ongoing parking procedure, for example as a result of a changing gripping status.

Another possibility is for all parking assistance functions to be deactivated when a gripping status changes, i.e., no switch is made to another assistance function in some embodiments. This applies, for example, to cases in which an initial parking assistance function is selected on the basis of the gripping status. If the gripping status then changes, this may also be interpreted as a signal from the driver that they do not want any kind of support. This applies, for example, when said driver grips the steering wheel after previously releasing or not gripping same. This may be recognized and interpreted as a desire to gain full control over the vehicle and then, for example, activation of a parking assistance function for generating steering hints of the type described above may also be dispensed with.

In some embodiments, the behavior of the vehicle or of a control circuit thereof may be configured in response to a changing gripping status. For example, a driver may configure, for example flexibly and/or reversibly, whether they want an automatic switch to another parking assistance function when the gripping status changes and/or whether all parking assistance functions should then be terminated. The driver may also define conditions or statuses of the type described above and according to which only in the event of certain changes to the gripping status should a switch be made between parking assistance functions which are then for example specified in concrete terms.

The driver may also configure the status conditions for setting initially selected parking assistance functions in some embodiments. For this purpose, the driver may for example specify logical links that describe the status condition and the action to be carried out in the presence of said status condition. Furthermore, it is possible to specify an alternative that defines the action to be taken if the status condition is not met. Logical links of this kind may be referred to as an IF-THEN-ELSE relationship or link.

In addition or as an alternative to the monitoring of changes to the gripping status and in some embodiments, at least one other interaction of the driver with the vehicle may be monitored and/or detected during the ongoing parking procedure. For example, the actuation of a gas pedal, brake pedal, clutch pedal, or a gear change may be recognized. This may be interpreted as a desire of the driver to switch from a parking assistance function with a high level of autonomy (for example the second parking assistance function) to a parking assistance function with a low level of autonomy (for example the first parking assistance function). Alternatively and in some embodiments, when a corresponding actuation is detected, a currently selected parking assistance function may be deactivated and no other parking assistance function activated, i.e., the driver may regain full manual control of the vehicle.

Additionally or alternatively and in some embodiments, at least one activation condition may be checked, for example when a parking assistance function with autonomous longitudinal guidance is selected, prior to actual activation or implementation of the parking assistance function. This may for example involve a check as to whether the driver is sitting on their seat, for example by means of seat sensors. Additionally or alternatively and in some embodiments, an attentiveness check may be carried out on the driver, for example by means of viewing angle detection, in order to ensure that the driver is monitoring the parking procedure and may intervene reliably. Furthermore, a specific actuation on the part of the driver may be required as an activation criterion, e.g. actuation of the brake, in order to signal, at least indirectly, that the driver is able to monitor the parking procedure.

In some embodiments, a motor vehicle is provided, comprising:
  a steering handle;
  a sensor apparatus for determining a gripping status of the steering handle by a vehicle driver;
  a control circuit, which is configured to choose between a first and a second parking assistance function depending on the determined gripping status.

In general terms, the motor vehicle and for example the control circuit are configured to carry out the method(s) according to any embodiment(s) described herein. In principle, the motor vehicle and for example the control circuit may comprise any feature and/or any function in order to provide all of the measures, interactions, and effects according to the disclosed methods or their embodiments described herein. All explanations pertaining to details of the disclosed methods may also be applied to the motor vehicle and for example to the control circuit.

The control circuit (also herein referred to as 'control unit') may comprise at least one processor and/or at least one memory. Program instructions may be saved in the memory and, when executed by the processor, may cause the control circuit to perform all measures and for example method steps described herein. The control circuit may be connected by means of the sensor apparatus so as to transfer data, for example via a communication bus. The parking assistance functions may be executed by the control circuit when they are activated following a corresponding selection (or are activated automatically by means of the selection). For this purpose, the control circuit may, in a manner known per se, actuate an actuator of the steering system and for example an actuator that is coupled to the steering handle.

Further embodiments are discussed below with reference to the appended schematic FIGS. In all FIGS., the same reference numerals may be used for components, process steps, and other elements with the same effect or of the same type.

Specific references to components, process steps, and other elements are not intended to be limiting. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a motor vehicle 10 that is depicted in a highly simplified manner. The view corresponds to a side view, but vehicle doors are not shown and individual components of the motor vehicle 10 that cannot normally be seen from outside are shown for illustrative purposes.

The motor vehicle 10 is a passenger car. It comprises a steering handle in the form of a steering wheel 12. This is connected by a steering rod 14 to a steering system 16. The steering system 16 comprises a steering gear 18, which is mechanically connected to the front wheels 20. The steering gear 18 is depicted in a highly simplified manner. A steering actuator 22 is coupled to the steering gear 18. Said steering actuator may, in a manner known per se, act on a rack and thus deflect the steering gear and the front wheels 20 coupled hereto autonomously of the driver. However, since the steering handle 12 is connected via the steering rod 14 to the steering gear 18, torques are also transmitted to the steering handle 12 as a result. In other words, the actuator 22 may thus generate torques that are effective on the steering wheel 12 but may also deflect the front wheels 20 autonomously of the driver.

A sensor apparatus 24 is arranged on the steering handle 12. This is a so-called hands-off or hands-free sensor/detection apparatus. It is configured to detect when the driver is gripping or not gripping the steering handle 12.

The motor vehicle 10 also comprises a control circuit 26. As indicated by dashed data lines, the control circuit is connected to the sensor apparatus 24. As such, the sensor apparatus 24 may provide information as to the current gripping status (gripping or non-gripping) of the steering handle 12 or the sensor apparatus 24 may provide information from which said information may be derived.

Moreover, the control circuit 26 is connected to the actuator 22. As a result, the control circuit 26 is configured to actuate the actuator 22 such that same introduces or transmits torques to the steering gear 18. In this way, firstly, a wheel steering angle that is effective for steering may be set autonomously of the driver (i.e. via actuator 22), i.e. the vehicle 10 may be steered autonomously or, more precisely, transversely guided. Secondly, on account of the above-described mechanical coupling with the steering handle 12, a feedback torque that is perceptible on the steering handle 12 may be generated as a result.

It should be noted that, in the case of steer-by-wire steering systems, the torque on the steering handle 12 is for example generated via a separate actuator that may also be coupled to the control apparatus 26.

Furthermore, the control circuit 26 is connected to, merely by way of example, two and for example many more environment sensors 30. These sensors may record information relating to the environment and may, as is known, automatically recognize parking spaces.

The control circuit 26 also comprises an indicated processor apparatus 32 and a memory apparatus 34. Various parking assistance functions in the form of programs, software modules or software applications are stored on the memory apparatus 34. Upon execution by means of the processor apparatus 32, the control circuit 26 may operate the vehicle 10 in accordance with said parking assistance functions and, in accordance therewith, actuate the actuator 22, for example.

In the present case, only one of the parking assistance functions may be executed at any given time in such a way that it intervenes in transverse guidance (i.e. only one assistance function may intervene in the transverse guidance at any given time). As a result, the actuator 22 cannot be actuated, in order to intervene in the transverse guidance, by/with different parking assistance functions at the same time.

In the example shown, the first parking assistance function is intended for primarily manual parking and the control circuit 26, by means of the actuator 22, generates torques that are merely temporarily perceptible on the steering handle 12 as steering hints. As a result, transverse guidance of the vehicle 10 is not carried out completely autonomously of the driver. For example, no transverse guidance of such an extent that would allow for pulling into or out of a parking space takes place. Instead, a steering hint is merely output to the driver via the torques generated on the steering handle 12, for example when said driver has reached a suitable turn-in point for driving into a recognized parking space.

Furthermore, a second parking assistance function is provided, by means of which the motor vehicle 10 is transversely guided, and optionally also longitudinally guided, autonomously of the driver. In this case, the driver for example generates no torques that are effective for steering, but rather these are for example generated exclusively autonomously of the driver.

The control circuit 26 is configured to carry out methods of the type explained below by way of example with reference to FIG. 2 and FIG. 3.

Figure 2:
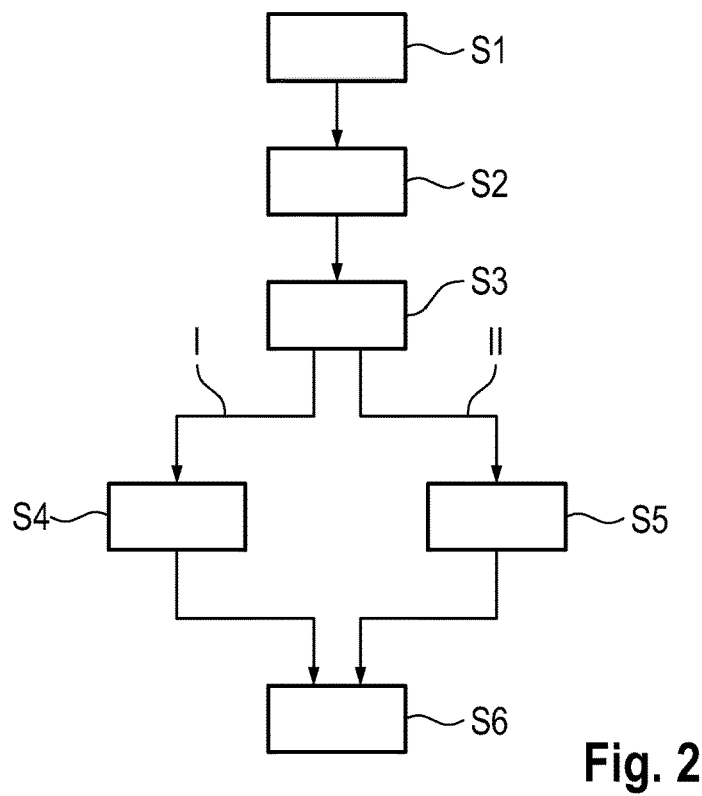
FIG. 2 shows a flow chart of a method according to a first exemplary embodiment that may be carried out by the vehicle of FIG. 1.

According to the exemplary method from FIG. 2, a driver's wish to park is initially recognized in a step S1. This may take place in that the driver activates the automatic search for parking spaces and/or generally makes a corresponding input via an operating element (not shown separately here) or via an operating option (e.g. via speech command). In a manner known per se, the motor vehicle will then detect the vehicle surroundings by means of the environment sensors 30 and attempt to identify parking spaces.

In a step S2, it is established that a parking procedure is actually to be carried out or is imminent. This may for example be the case if a parking space has been recognized, this has been signaled to the driver (e.g. via output of visual information or via audio output) and the driver subsequently stops the vehicle. In a step S3, the control circuit 36 determines a current gripping status by accessing the sensor apparatus 24. If said gripping status corresponds to the steering handle 12 being gripped (arrow I in FIG. 2), the above-described first parking assistance function is automatically selected at least as an initial parking assistance function and automatically activated (i.e. implemented by the control apparatus 20). By gripping the steering handle 12, the driver signals that they would like to retain at least some control over the parking procedure. In contrast, if in the step S3 the gripping status is determined to be that of the steering handle 12 not being gripped (see arrow II in FIG. 2), the second parking assistance function is selected and activated. Optionally, any change to the gripping status may subsequently be monitored continuously in a step S6, regardless of which parking assistance function is activated. If a change is detected (i.e. from initial gripping to non-gripping or vice versa), a switch may be made to the respective other parking assistance function that was not initially selected.

Alternatively, instead of a switch, a current parking assistance function may be deactivated and no new other parking assistance function activated, such that no support whatsoever is provided for parking.

Figure 3:
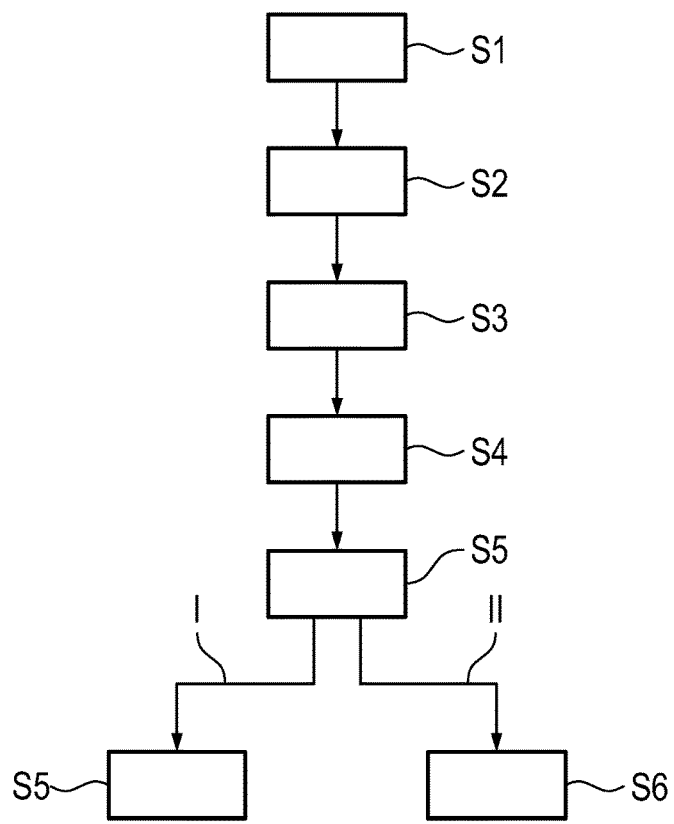
FIG. 3 shows a flow chart of a method according to a second exemplary embodiment that may be carried out by the vehicle of FIG. 1.

FIG. 3 shows a method sequence according to an alternative exemplary embodiment. In a step S1, a driver's wish to park is again identified as in the variant from FIG. 2. In the step S2, as in the variant from FIG. 2, it is established that the parking procedure is imminent. In a step S3, which may in principle be carried out prior to or in parallel with the step S2, predefined default configuration settings that are stored, for example, in the memory apparatus 34 are then checked for the purpose of selecting an initial parking assistance function. For example, it is checked whether or which parking assistance function should currently (at least initially) be selected according to these default configuration settings. For this purpose, status conditions of the type explained in the general part of the description are detected and/or checked. These may also be independent of a gripping status of the steering handle 12.

In a step S4, an initially selected parking assistance function is activated based on the default configuration setting and the parking procedure is then started. In a step S5, the gripping status is monitored during the parking procedure. If said gripping status changes, a switch may be made to another parking assistance function as per the arrows I, II. For example, according to the arrow I, there may be a switch from initial gripping to non-gripping and, as a result, the second parking assistance function may be activated. In contrast, according to the arrow II, there may be a switch from non-gripping to gripping and, as a result, the first parking assistance function may be activated. Furthermore, subsequent continuous monitoring of the like in the step S6 from FIG. 2 is possible. Equally, any support or parking assistance function may also be deactivated when the gripping status changes again.

The exemplary embodiments shown may be supplemented by any other variants from the general part of the description and/or changed accordingly. For example, after the selection of a parking assistance function, another predefined actuation on the part of the driver, for example of a brake pedal, may be checked in addition or as an alternative to the gripping status. If such an actuation has taken place, the parking assistance function may be changed or all parking assistance functions may in principle be deactivated. Furthermore, within the scope of the method described and for example that from FIG. 3, a driver may flexibly adapt or change the default configuration setting for selecting an initially active parking assistance function. For this purpose, said driver may for example define situations in which they would for example initially like to automatically activate one of the parking assistance functions and this may then be implemented accordingly in the future. For example, however, the gripping status is then also evaluated or monitored within the scope of the parking procedure in order to change the initially selected parking assistance function if necessary.

LIST OF REFERENCE NUMERALS

10 Motor vehicle
12 Steering handle
14 Steering shaft
16 Steering system
18 Steering gear
20 Front wheel
22 Actuator
24 Sensor apparatus
26 Control circuit
30 Environment sensor
32 Processor apparatus
34 Memory apparatus The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for operating a motor vehicle for carrying out a parking procedure, wherein the motor vehicle is configured with at least a first parking assistance function and a second parking assistance function which may be selected, wherein the first parking assistance function is configured to generate at least temporarily effective torque on a steering handle as a steering hint for the driver, wherein the second parking assistance function is configured to generate steering torque required for parking autonomously of the driver, wherein the method comprises:
    initially selecting one of the first and second parking assistance function on the basis of at least one default configuration setting, wherein the default configuration setting defines at least one status condition which must be met in order for one of the first and/or second parking assistance function to be selected initially;
    detecting a gripping status of a steering handle of the motor vehicle by a driver; and
    automatically selecting and thus switching to the respective other of the first and the second parking assistance function depending on the detected gripping status.

2. The method of claim 1, wherein, if the gripping status changes, a switch is made to the respective other of the first and second parking function.

3. The method of claim 2, wherein a switch is made from the first to the second parking assistance function if the gripping status indicates that the steering handle is not being gripped by the driver.

4. The method of claim 2, wherein a switch is made from the second to the first parking assistance function if the gripping status indicates that the steering handle is being gripped by the driver.

5. The method of claim 1, wherein a switch is made from the first to the second parking assistance function if the gripping status indicates that the steering handle is not being gripped by the driver.

6. The method of claim 1, wherein a switch is made from the second to the first parking assistance function if the gripping status indicates that the steering handle is being gripped by the driver.

7. A motor vehicle, configured for carrying out a parking procedure, the motor vehicle comprising:
    a steering handle;
    a sensor apparatus for determining a gripping status of the steering handle by a vehicle driver;

a control circuit, which is configured with a first and a second parking assistance function, wherein the first parking assistance function generates at least temporarily effective torque on a steering handle as a steering hint for the driver and the second parking assistance function generates steering torque required for parking autonomously of the driver, wherein the control circuit is configured to:

initially select one of the first and second parking assistance function on the basis of at least one default configuration setting, wherein the default configuration setting defines at least one status condition which must be met in order for one of the first and/or second parking assistance function to be selected initially;

detect a gripping status of a steering handle of the motor vehicle by a driver; and automatically select and switch to the respective other of the first and the second parking assistance function depending on the determined gripping status.

8. The motor vehicle of claim 7, wherein the control circuit is configured to, if the gripping status changes, switch to the respective other of the first and second parking function.

9. The motor vehicle of claim 7, wherein the control circuit is configured to switch from the first to the second parking assistance function if the gripping status indicates that the steering handle is not being gripped by the driver.

10. The motor vehicle of claim 7, wherein the control circuit is configured to switch from the second to the first parking assistance function if the gripping status indicates that the steering handle is being gripped by the driver.

11. A control circuit for a motor vehicle, configured to conduct a parking procedure, the control circuit being configured with a first and a second parking assistance function, wherein the first parking assistance function generates at least temporarily effective torque on a steering handle as a steering hint for the driver and the second parking assistance function generates steering torque required for parking autonomously of the driver, wherein the control circuit is configured to:

initially select one of the first and second parking assistance function on the basis of at least one default configuration setting, wherein the default configuration setting defines at least one status condition which must be met in order for one of the first and/or second parking assistance function to be selected initially;

detect a gripping status of a steering handle of the motor vehicle by a driver; and automatically select and switch to the respective other of the first and the second parking assistance function depending on the determined gripping status.

12. The control circuit of claim 11, wherein the control circuit is configured to, if the gripping status changes, switch to the respective other of the first and second parking function.

13. The control circuit of claim 11, wherein the control circuit is configured to switch from the first to the second parking assistance function if the gripping status indicates that the steering handle is not being gripped by the driver.

14. The control circuit of claim 11, wherein the control circuit is configured to switch from the second to the first parking assistance function if the gripping status indicates that the steering handle is being gripped by the driver.

* * * * *